United States Patent [19]

Forslund

[11] Patent Number: 4,549,588
[45] Date of Patent: Oct. 29, 1985

[54] METHOD AND AN APPARATUS FOR CROSS-CUTTING TREE STEMS TO PRE-DETERMINED LENGTHS

[75] Inventor: Torsten E. Forslund, Alfta, Sweden

[73] Assignee: Osa AB, Alfta, Sweden

[21] Appl. No.: 580,599

[22] Filed: Feb. 16, 1984

[30] Foreign Application Priority Data

Feb. 17, 1983 [SE] Sweden .............................. 8300888

[51] Int. Cl.⁴ ................................................ B27B 1/00
[52] U.S. Cl. ...................................... 144/356; 83/250
[58] Field of Search .................... 83/219, 220, 250; 144/2 Z, 356, 357, 379

[56] References Cited

U.S. PATENT DOCUMENTS 4,250,935  2/1981  Helgesson et al. .................. 144/2 Z
4,257,461  3/1981  Wangeby et al. .................... 144/2 Z

FOREIGN PATENT DOCUMENTS 2409014  9/1974  Fed. Rep. of Germany ...... 144/357

Primary Examiner—W. D. Bray
Attorney, Agent, or Firm—Cushman, Darby & Cushman

[57] ABSTRACT

The invention relates to a method at the cross-cutting of tree stems to pre-determined timber lengths. According to the invention, an impulse is triggered when the nominal timber length has been attained, which impulse stops the advance movement and braking is effected while the braking energy is accumulated all the way to the stop of the stem after the stem has moved through a certain distance beyond the nominal length. The accumulated braking energy then is released for moving the stem back to substantially the nominal length, whereafter the cross-cutting is carried out. At an apparatus for carrying out the method according to the invention, the feeding wheels (2) of the stem (1) are driven by hydraulic motors (7) having a pressure conduit (5) and a return conduit (6) in common. The return conduit is connected to a pressure accumulator (9). A stop valve (8) is laid-in in each conduit (5,6). A measuring wheel (4) abutting the stem is provided with an impulse device, which is capable at attained nominal length (L) to emit an impulse to the valves (8) for closing the conduits (5,6) and thereby braking the stem. The braking pressure arising in the closed return conduit (6) builds up the pressure in the accumulator all the way to the stop of the stem. The accumulated braking energy there is released for returning the stem to the nominal position (N), where cross-cutting is effected by a cutting tool (3).

5 Claims, 2 Drawing Figures

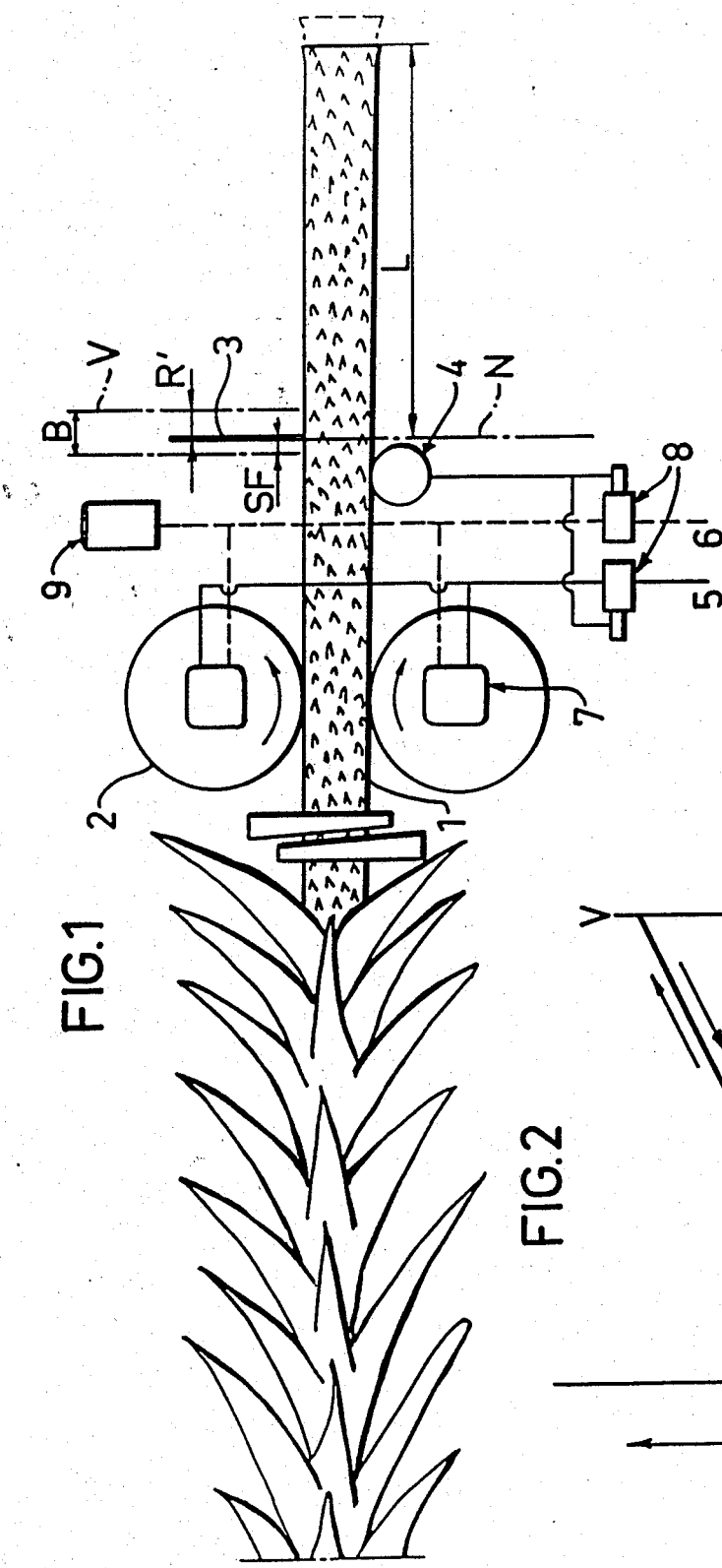
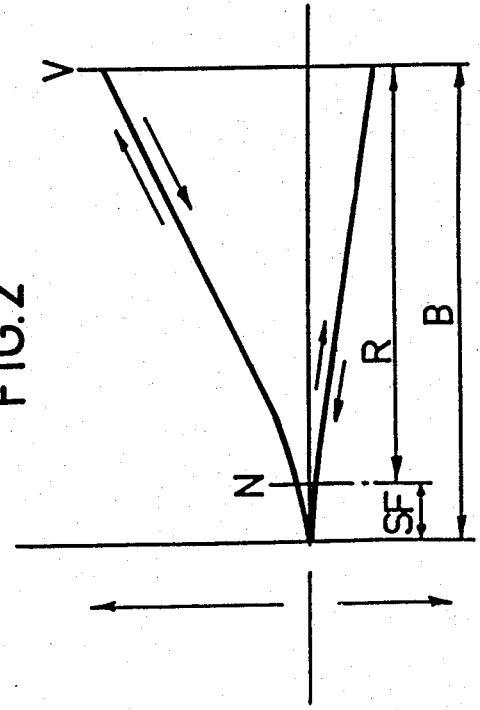

METHOD AND AN APPARATUS FOR CROSS-CUTTING TREE STEMS TO PRE-DETERMINED LENGTHS

This invention relates to a method for cross-cutting of tree stems to definite lengths, in which the stem during continuous length measuring is advanced at a high speed in the direction to a cutting tool. After braking in response to an impulse triggered by the measuring device is cross-cut in the position corresponding to the predetermined length. The invention also relates to an apparatus for carrying out the method.

In the highly mechanized forestry of today timber is required to be cross-cut with an accuracy of at maximum 5 cm over the nominal length, though the stem advancing speed can be up to towards 2.5 m/s. At this speed, which implies 2.5 cm/one hundredth second, the braking of the timber has to be effected in some few hundredths of seconds, if the braking at the arrival in the intended place of cross-cutting would be effected in conventional manner. The mass forces of a large and heavy stem at this speed, however, cannot be stopped in such a short time, partly due to insufficient braking grip against the stem, but above all due to unacceptable load tops, which would affect the hydraulic system and mechanical structure of the machine.

It has, therefore, normally been necessary to extend the braking process through a relatively long time span calculated so as to cause the stem to stop at the desired place of cross-cutting. This, however, obviously is a time-consuming process, when the required accuracy is to be maintained safely.

The aforesaid shortcomings are eliminated by the method according to the present invention, which is characterized in that at attained desired timber length a stop impulse is emitted for braking the stem softly to stop a distance after the intended place of cross-cutting, while accumulating the braking energy hereby developed, which energy is released after the stop for returning the stem substantially through the same distance to a cross-cutting position substantially corresponding to the stop impulse, whereafter the cross-cutting is effected.

The invention is described in greater detail in the following, with reference to the accompanying drawing, in which FIG. 1 is a schematic view of an apparatus suitable for carrying out the method according to the invention, and FIG. 2 is a diagram of the braking and return movement process.

FIG. 1 shows a tree stem 1, which between two hydraulically driven feed wheels 2 is advanced to nominal timber length L, counted from a position N where a cutting tool 3 movable to and from the stem is located. A stationary measuring wheel 4 abuts the stem in usual manner for continuously measuring the stem length. The measuring wheel is provided with an impulse device for emitting an impulse at attained timber length. A pair of drive wheels 2 and 7 are in constant contact with the timber as it moves through the apparatus. These wheels are mounted on and operated by hydrualic motors 7 having supply lines 5 and return lines 6. The supply and return lines are each provided with shut-off valves 8 which are actuated by the impulse from the measuring wheel 4. A pressure accumulator 9 is provided in the return line between the motors 7 and valve 8.

The arrangement described above operates as follows. When the stem 1 substantially (guarded against skidding and friction) has arrived at the position shown in FIG. 1 corresponding to nominal timber length L, the impulse device of the measuring wheel 4 emits an impulse to the stop valves 8 for blocking simultaneously both the pressure conduit 5 and return conduit 6. The mass force of the heavy stem during the forward movement forces the feeding wheels 2 to continue their rotation and thereby transfer a torque to the hydraulic motors 7. These motors then start acting as hydraulic pumps, which yield overpressure in the ordinary return conduit 6 and underpressure (vacuum) in the previous pressure conduit 5.

Due to the blocking of the conduits 5 and 6, the pressure in the blocked return conduit 6 increase rapidly. This pressure rapidly propagates to the connected accumulator 9, at the same time as the pressure acts obstructing to the movement of the hydraulic motors 7. At continued but reduced movement the pressure is increasingly built up in the accumulator 9, which results in that the motors 7 and therewith also the feeding wheels 2 and the stem are caused to stop. The stem then has moved beyond the nominal length by the braking distance B. The braking proceeds rapidly (fractions of a second), but softly at optimum due to the hydraulic buffer system, which treats the hydraulic and mechanical components tenderly and reduces sliding between feeding wheels and stem to a minimum. In the Figure the position of the stem end now attained is indicated by dashed lines.

The overpressure built-up in the accumulator 9 in continuation affects the hydraulic motors with "back pressure", so that the motors are caused to reverse the rotation direction at an end position V. The feeding wheels 2 then drive the stem 1 in return movement to the nominal cross-cutting position N, corresponding to the distance which the stem has moved during the braking phase. When the overpressure in the accumulator 9 has ebbed out, the stem has been retarded to stop in the position N to be cross-cut in the appropriate tolerance range, and the cutting tool 3 can carry out the cross-cut. The cross-cutting could be carried out manually after it has been observed that the stem has stopped, but preferably the cross-cutting operation is by an automatic processing chain. This can be effected because the impulse device is also prepared to emit a cross-cutting impulse to the cutting tool when the pulses from the measuring wheel have stopped.

It was maintained above, that at the same time as the ordinary return conduit 6 during the braking phase is subjected to braking pressure, the ordinary pressure conduit 5 is subjected to vacuum. This contributes, though to a small extent, to the braking of the hydraulic motors 7 and thereby to a shortening of the braking distance for the stem. The diagram in FIG. 2 shows in principle the co-operation effected by pressure and vacuum during the braking and return phase. The diagram also illustrates the fact that due to sliding and friction—distance SF—the return distance R for the stem in practice is slightly shorter than the braking distance B (see also FIG. 1). This difference can in practice easily be compensated for by such programmed "lateral lead" in the measuring system of the measuring wheel 4, that the cross-cutting is effected within the tolerance range. When the cross-cutting has been completed, the stem advancing is resumed for the next work cycle, in that the cutting tool at its return to starting position triggers (not shown) an impulse for opening the two stop valves 8 whereby the hydraulic motors are again started in the advancing direction.

The invention is not restricted to the embodiment described above, but different modifications and arrangements of the components comprised therein for accumulation and release of the braking energy are obvious to the expert. The hydraulic accumulator described, for example, could be replaced by a pressure accumulator of mechanical type, for example a piston-cylinder device with return spring.

What I claim is:

1. A method for the cross-cutting of timber to predetermined lengths comprising advancing timber towards a cross-cutting tool, measuring said predetermined length during advancing of the timber, producing an impulse corresponding to said predetermined lengths at a cross-cutting saw and to brake the advancing timber, accumulating the braking energy from the braking of the timber, using said accumulated energy to return the timber to the position corresponding to the predetermined length at the cutting saw, and cutting the timber at the predetermined length.

2. A method for the cross-cutting of timber to predetermined lengths comprising advancing timber towards a cross-cutting tool by a feed drive, measuring said timber during advancing, the measuring being conducted by a means capable of producing an impulse corresponding to a predetermined length of the timber at the cutting saw, braking the feed device and the advancement of the timber, the braking being responsive to the impulse, accumulating the braking energy, utilizing the braking energy when the timber has stopped to return the timber to its position corresponding to the predetermined length at the cutting tool, and cutting said timber at the predetermined length.

3. An apparatus as defined in claim 2, characterized in that the pressure accumulator is a piston-cylinder device with a return spring.

4. An apparatus for cross-cutting timber to predetermined lengths comprising a feeding means to advance the timber, a means for continuously measuring the timber, a cutting means, the measuring means capable of producing a pulse corresponding to a cutting position at said predetermined length, the cutting means capable of cutting the timber at the cutting position, a means to interrupt the feeding means in response to said pulse, a means to brake the feeding means to stop the advancing timber, an accumulator to store braking energy developed by the timber as it passes the cutting position, the accumulator being capable of releasing the braking energy to return the timber to the cutting position.

5. An apparatus for cross-cutting timber to predetermined lengths comprising a feeding means to advance timber to a cross-cutting saw, the feeding means comprising at least one wheel driven by a hydraulic motor; a means for continuously measuring the timber, the measuring means capable of creating an impulse corresponding to a desired cutting position of the timber at the cross-cut saw, the cutting position corresponding to the predetermined length; feed and return lines leading from a hydraulic pressure source to said motor valve means disposed in each of the supply and return lines the valves being actuated by said impulse to interrupt the feeding means, the motors capable of serving as a braking means for the advancing timber due to a pumping action by the motor, a pressure accumulator in said return line to store braking energy caused by said pumping action, the accumulator capable of returning fluid pressure to said motor to reverse the direction of the motor thereby returning the timber to the desired cross-cutting position.

* * * * *